United States Patent [19]
Ramsay et al.

[11] Patent Number: 5,800,717
[45] Date of Patent: Sep. 1, 1998

[54] WATER AND WASTEWATER TREATMENT SYSTEM WITH INTERNAL RECIRCULATION

[75] Inventors: Stephen R. Ramsay, Vancouver, Canada; Donald G. Nyberg, Vashon, Wash.

[73] Assignee: Microsep International Corporation, British Columbia, Canada

[21] Appl. No.: 720,551

[22] Filed: Oct. 2, 1996

[51] Int. Cl.[6] ................................................. C02F 1/56

[52] U.S. Cl. .................... 210/711; 210/713; 210/714; 210/727; 210/738

[58] Field of Search ........................... 210/711, 713, 210/714, 726, 727, 738

[56] References Cited

U.S. PATENT DOCUMENTS

| | | | |
|---|---|---|---|
| 3,350,302 | 10/1967 | Demeter et al. | 210/711 |
| 4,536,286 | 8/1985 | Nugent | 210/205 |
| 4,775,468 | 10/1988 | Peterson | 210/205 |
| 4,927,543 | 5/1990 | Bablon et al. | 210/711 |
| 4,997,573 | 3/1991 | Browne | 210/714 |

*Primary Examiner*—Peter A. Hruskoci
*Attorney, Agent, or Firm*—Seed and Berry LLP

[57] ABSTRACT

A sedimentation device for treating water and wastewater utilizing differential sedimentation and recirculation in an internal recirculation reactor with an upflow zone and a downflow zone within a settling tank. Inert particles are added to the internal recirculation reactor to increase the growth rate of forming flocs and increase the differential sedimentation of the flocs in the downflow zone.

12 Claims, 8 Drawing Sheets

| DATE | INFLUENT FLOW | | RISE VELOC | SCC RT | TSS | | | COD | | |
|---|---|---|---|---|---|---|---|---|---|---|
| | | | | | INFLUENT | EFFLUENT | REMOVAL RATE | INFLUENT | EFFLUENT | REMOVAL RATE |
| mm/dd/yy | m³/h | m³/d | m/h | sec | g/m³ | g/m³ | | g/m³ | g/m³ | |
| 11/15/95 | 50.5 | 1212 | 9.1 | 30 | 103 | N/A | N/A | N/A | N/A | N/A |
| 11/15/95 | 39.8 | 955 | 7.2 | 38 | 133 | 20 | 85% | N/A | N/A | N/A |
| 11/16/95 | 55.6 | 1334 | 10.0 | 27 | 132 | 12 | 91% | N/A | N/A | N/A |
| 11/16/95 | 55.6 | 1334 | 10.0 | 27 | 134 | 21 | 84% | N/A | N/A | N/A |
| 11/17/95 | 55.5 | 1332 | 10.0 | 27 | 107 | 5 | 95% | N/A | N/A | N/A |
| 11/20/95 | 54.9 | 1318 | 9.9 | 28 | 90 | 29 | 68% | N/A | N/A | N/A |
| 11/21/95 | 54.9 | 1318 | 9.9 | 28 | 115 | 11 | 90% | 281 | 121 | 57% |
| 11/21/95 | 52.1 | 1250 | 9.4 | 29 | 124 | 8 | 94% | 305 | 131 | 57% |
| 11/22/95 | 63.4 | 1522 | 11.4 | 24 | 130 | 21 | 84% | 364 | 211 | 42% |
| 11/23/95 | 35.8 | 859 | 6.5 | 42 | 80 | 23 | 71% | 161 | 82 | 49% |
| 11/23/95 | 53.1 | 1274 | 9.6 | 28 | 153 | 25 | 84% | N/A | N/A | N/A |
| 11/24/95 | 34.2 | 821 | 6.2 | 44 | 116 | 17 | 85% | 205 | 90 | 56% |
| 12/01/95 | 54.6 | 1310 | 9.9 | 28 | 87 | 8 | 91% | N/A | N/A | N/A |
| 12/05/95 | 44.3 | 1064 | 8.0 | 34 | 96 | 13 | 86% | 221 | 98 | 56% |
| 12/06/95 | 27.8 | 667 | 5.0 | 54 | 144 | 16 | 89% | N/A | N/A | N/A |
| 12/06/95 | 33.8 | 811 | 6.1 | 45 | 116 | 14 | 88% | 327 | 139 | 57% |
| 12/07/95 | 35.6 | 854 | 6.4 | 42 | 140 | 15 | 89% | N/A | N/A | N/A |
| 12/14/95 | 19.0 | 456 | 3.4 | 80 | 132 | 29 | 78% | 249 | 117 | 53% |
| AVERAGE | 45.6 | 1094 | 8.2 | 36 | 118 | 17 | 85% | 264 | 124 | 53% |
| MINIMUM | 19.0 | 456 | 3.4 | 24 | 80 | 5 | 68% | 161 | 82 | 42% |
| MAXIMUM | 63.4 | 1522 | 11.4 | 80 | 153 | 29 | 95% | 364 | 211 | 57% |

SCC=SOLIDS CONTACT CHAMBER

WATER AND WASTEWATER TREATMENT SYSTEM WITH INTERNAL RECIRCULATION

BACKGROUND OF THE INVENTION

1. Field of the Invention

The present invention generally relates to gravitational separation by sedimentation and, more particularly, to systems for continuously separating suspended solid materials from a liquid feed stream by differential sedimentation.

2. State of the Art

Sedimentation devices which incorporate settling tanks are well known to separate suspended solids from streams of liquid, such as water and wastewater, by gravitational settling. To increase the effectiveness of the liquid-solid separation it is well known to employ various chemical flocculating agents (e.g., polyelectrolytes) or coagulating agents (e.g. mineral salts). When mixed with the influent, the agents combine with suspended solids to form rapidly settlable aggregates, called flocs.

It is also known that settling of floc particles can be enhanced in certain circumstances by mixing the flocculating agents with inert particles such as sand. The mixing of flocculating agents and inert particles with the influent is accomplished outside the sedimentation (or settling) tank in a pipe or mixing chamber and, may be accompanied by mechanical stirring of the mixture to provide contact opportunity and time for the resulting flocs to grow.

It is known to use recirculation of impurities for floc growth until the flocs attain a size sufficient to settle. But there are still short-comings (such as long treatment times, costs, etc.) in the prior art devices that utilize the addition of chemical flocculating agents and sometimes inert particles or that utilize recirculation of impurities to produce flocs.

SUMMARY OF THE INVENTION

The present invention, in very general terms, provides a method and sedimentation device for treating water and wastewater utilizing differential sedimentation and recirculation of inert particles to enhance water and wastewater treatment. The present invention utilizes an internal recirculation reactor having an upflow zone and a downflow zone to accomplish mixing and differential sedimentation. Inert particles are added to the internal recirculation reactor to increase the growth rate of forming flocs and increase the differential sedimentation of the flocs in the downflow zone. The input and output of the internal recirculation reactor and the internal recirculation of the reactor being controlled so as to require short residence time in the internal recirculation reactor of the influent being treated.

The present invention provides an improved sedimentation device for treating potable water, industrial wastewater, municipal wastewater, industrial process water, and the like, in which the sedimentation device requires very short residence times while still providing good clarity in the clarified effluent. Influents which the sedimentation device of the invention is intended to treat include, for example, ground water, creek water, stream and river water, lake water, mineral slurries, pulp and paper slurries, flue gas scrubbing slurries, and municipal and industrial wastewaters, etc.

In one aspect of the present invention, there is provided a process for influent treatment by ballasted flocculation and differential sedimentation by combining a flow of pretreated influent, flocculant and inert particles with agitation in an internal recirculation reactor to produce a flocculated mixture, passing the flocculated mixture from an upflow zone of the internal recirculation reactor into a downflow zone of the internal recirculation reactor utilizing differential sedimentation, recirculating a first portion of the flocculated mixture from the downflow zone of the internal recirculation reactor into the upflow zone of the internal recirculation reactor, passing a second portion of the flocculated mixture from the downflow zone of the internal recirculation reactor into a settling zone and removing clarified liquid from an upper region of the settling zone and settled flocs from a lower region of the settling zone.

In another aspect of the present invention, there is provided an apparatus for influent treatment by ballasted flocculation and differential sedimentation having an internal recirculation reactor having a pretreated influent inlet, a flocculant inlet, an inert particles inlet, an upflow zone and a downflow zone to produce a flocculated mixture, a vessel in the internal circulation reactor, the vessel having an opening in a lower portion to receive a first portion of the flocculated mixture of a size less than a predetermined size from the downflow zone to be recirculated into the upflow zone, the downflow zone connecting the internal recirculation reactor to a settling zone having a settled flocs outlet such that the downflow zone passes a second portion of the flocculated mixture of a size greater than the predetermined size and further-treated influent into the settling zone without mechanical agitation and an outlet for removing clarified liquid from an upper portion of the settling zone.

Definitions

INTERNAL RECIRCULATION REACTOR—A zone in which fluid to be treated is mixed with flocculant and inert particles, moved by hydraulic and gravitational forces through a downflow zone in which differential sedimentation occurs, and separated by hydraulic forces such that flocculents (i.e., flocs) of smaller than a predetermined size are recirculated and flocculents of larger than a predetermined size settle out to be removed from the process.

INTERNAL RECIRCULATION RATIO—The ratio of flocculated mixture (IR) which is recirculated through the internal recirculation reactor compared to the total flow into the system (Q).

BRIEF DESCRIPTION OF THE DRAWINGS

The foregoing and other aspects of the present invention can be readily ascertained from the following detailed description and appended drawings, which are offered by way of example only and not in limitation of the invention, the scope of which is defined by the appended claims and equivalents. In the drawing:

DETAILED DESCRIPTION OF THE PREFERRED EMBODIMENTS

The sedimentation devices of each of the embodiments shown in FIGS. 1–4 include a settling tank or main vessel 2 in which separation by sedimentation principally occurs utilizing ballasted flocculation and differential sedimentation. Preferably, the settling tank 2 is cylindrical in configuration, but a rectangular or other shaped configuration can be used.

In the embodiments illustrated in FIGS. 1–4 vessel 2 is defined by a side wall 11 and bottom wall 13. Preferably, bottom wall 13 slopes downward at an angle of about 0 to 15 degrees toward a collection cone or box 15 formed centrally in the bottom wall 13 of tank 2 which when used with a rake 37 prevents any sludge from building up on the bottom wall 13 as the flocs settle in the settling tank 2. In other embodiments (not shown) without a rake, the bottom wall 13 slopes at an angle of 60 degrees or more towards the collection cone 15. As further shown in FIGS. 1–4, a collection system for clarified effluent (e.g., launder) 17 is mounted in the side wall 11 of the vessel 2. The collection system includes an outlet pipe 19 and an overflow weir 60, which defines the liquid level 29 in the tank 2.

Centrally disposed in the tank is a generally cylindrical vessel 23 which defines generally an internal recirculation reactor which includes an upflow tube 14 often referred to as a draft tube. The downflow vessel 23 can be supported from the bridge 24 by hangers 26 as shown (or other truss work which traverses the tank) or can be supported by extensions (not shown) extending inwardly from the inner walls of the settling tank 2. (Bridge 24 can be provided with handrail 20 and lifting lugs 22). In operation of the sedimentation system, the downflow vessel 23 forms the outer wall of the internal recirculation reactor and the inner wall of the clarification zone 5. Also supported by hangers 21 from bridge 24 is the upflow tube 14 of the internal recirculation reactor and in embodiments shown in FIGS. 1 and 3 the lower end of the upflow tube 14 slides into the rotating cylinder 28 which is attached to the rake 37. In the embodiments shown in FIGS. 2 and 4, the lower end of upflow tube 14 extends to a position in proximity above flow plate 64 which is attached to the rake shaft 9. It can now be appreciated that the outer surface 30 of the upflow tube 14 and the inner surface 32 of downflow vessel 23 define a downflow zone 34; the function and operation of the downflow zone 34 will be described in more detail below.

As still further shown in FIGS. 1–4, at least one inlet feed 43 is provided in fluid communication with the interior of the internal recirculation reactor upflow tube 14. By way of inlet feed 43, a stream of influent is fed in to lower portion 68 in the interior of the chamber 14. In the embodiments shown in FIGS. 1 an 2, one or more upflow or radial flow recirculation impellers are mounted near the top of the upflow tube 14. In the embodiments shown in FIGS. 3 and 4, one or more axial upflow turbines are mounted lower in the upflow tube 14. These arrangements can be used in combination (not shown) in desired embodiments for certain applications. The upper section 31 of the upflow tube 14 can be variable in height depending on the volume desired and the residence time desired and may have zero height in some cases. The impeller 47 is coupled to the drive unit 25 through shaft 7. Also located in the internal recirculation reactor upflow tube 14 is an inlet 16 which, as will be explained in greater detail below, injects recycled inert particles into the chamber from a separating device 6 or hydrocyclone underflow. Still further, a polymer or flocculating agent inlet 48 is located in the internal recirculation reactor 14. In practice, it is particularly advantageous to introduce the inert particles and flocculant as close together as possible to promote more rapid mixing of the inert particles. The inert particles employed in the system are typically 150 micrometers in diameter or less, but should be sufficiently large to maintain a relatively high settling velocity in the downflow zone 34 after flocs have formed around them. The inert particles also aid in taking advantage of the differential sedimentation phenomenon based on the heterogenous curvilinear flocculation theory.

Figure 1:
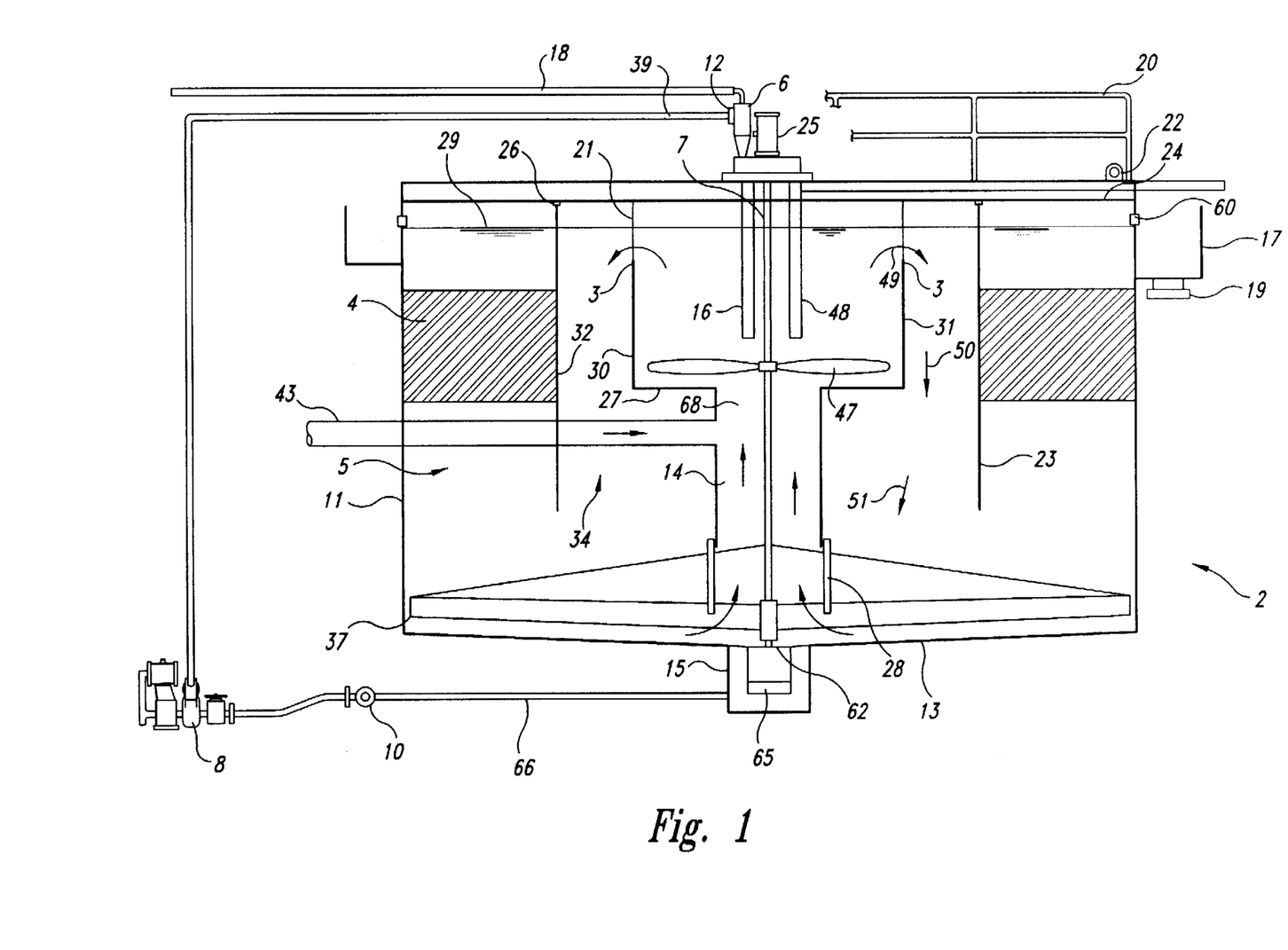
FIG. 1 is a cross-sectional view of a sedimentation device in accordance with one embodiment of the present invention, parts of which are shown schematically.
Figure 2:
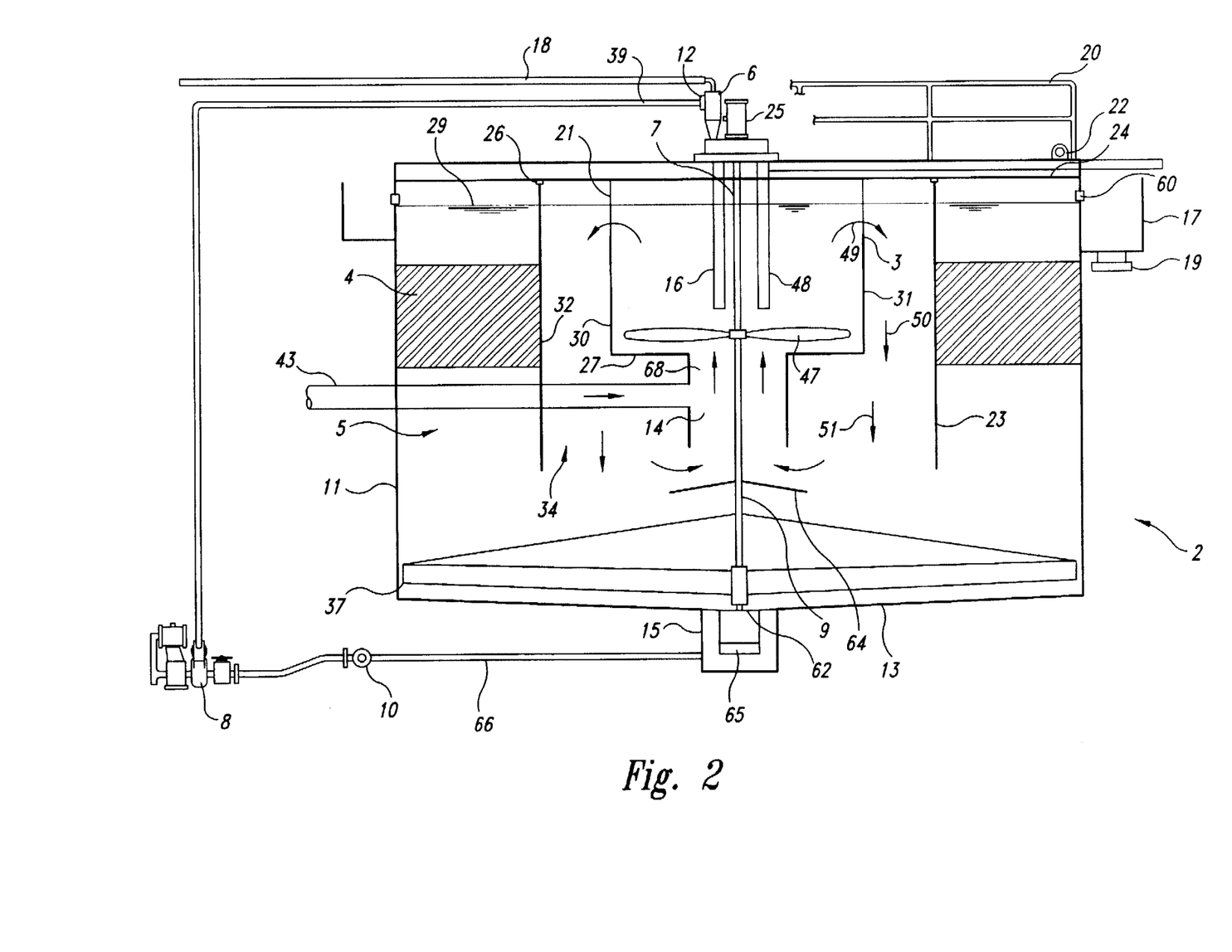
FIG. 2 is a cross-sectional view of a sedimentation device in accordance with another embodiment of the present invention, again with parts shown schematically.
Figure 3:
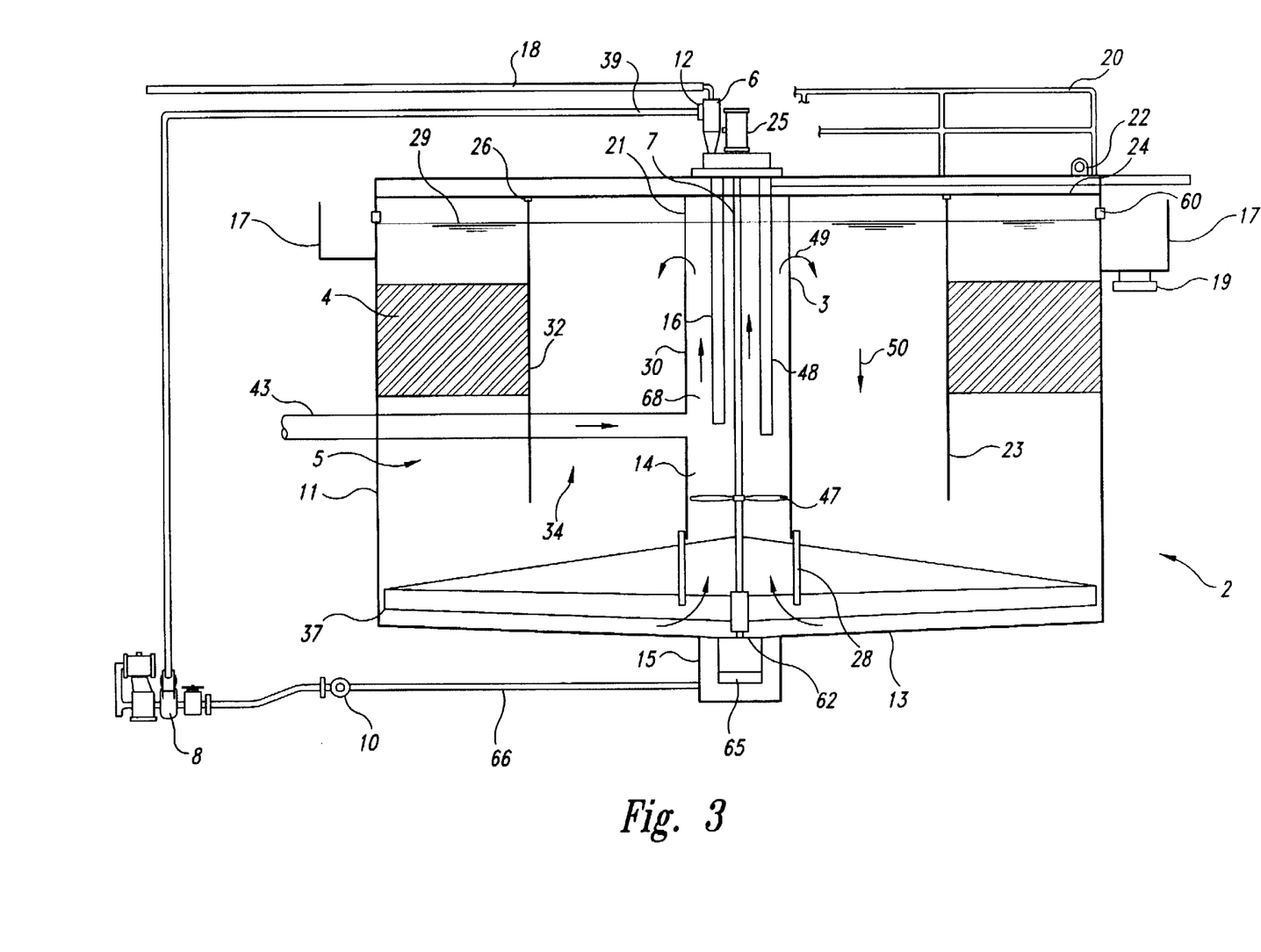
FIG. 3 is a cross-sectional view of a sedimentation device in accordance with yet another embodiment of the present invention, again with parts shown schematically.
Figure 4:
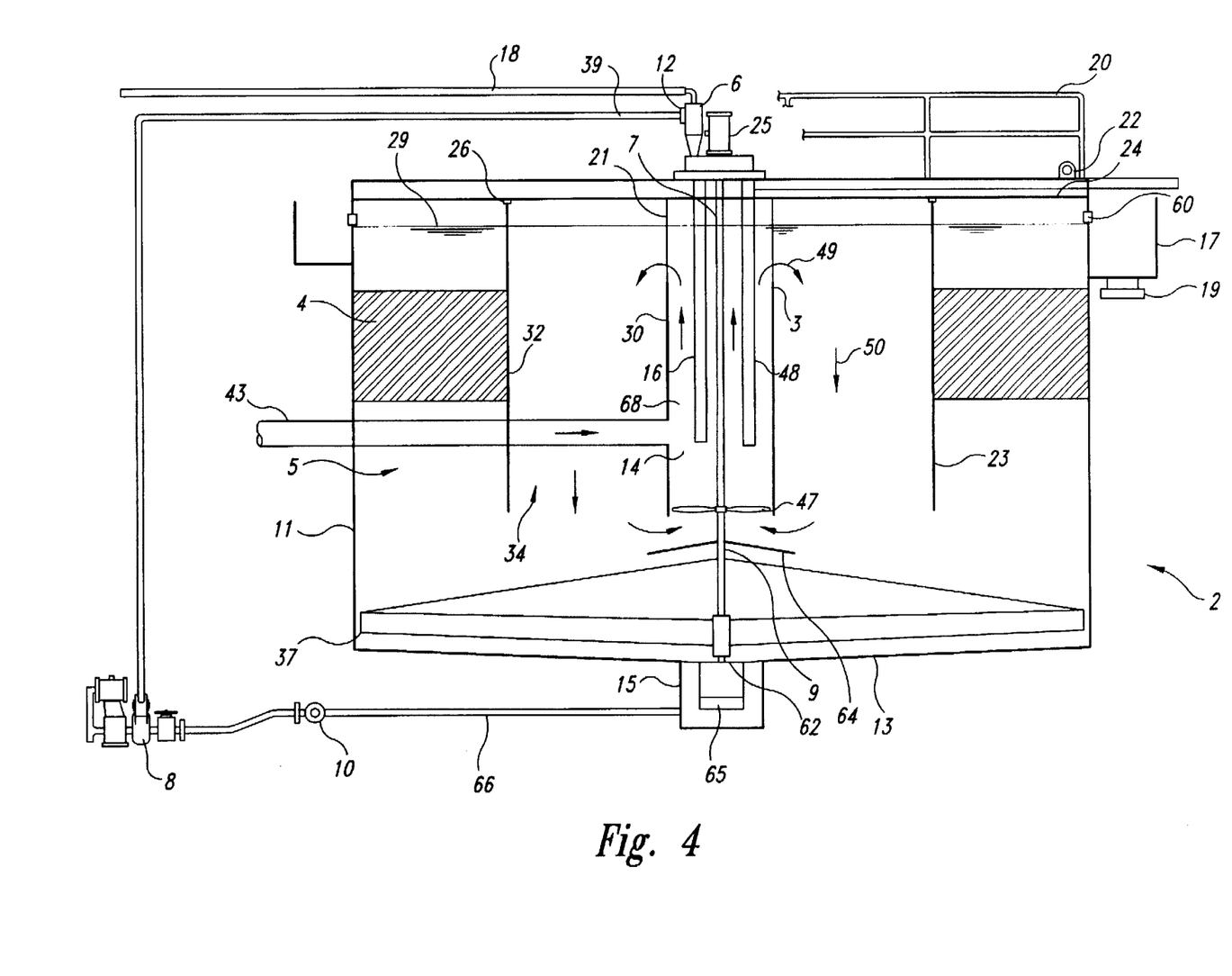
FIG. 4 is a cross-sectional view of a sedimentation device in accordance with still another embodiment of the present invention, again with parts shown schematically.
Figure 5:
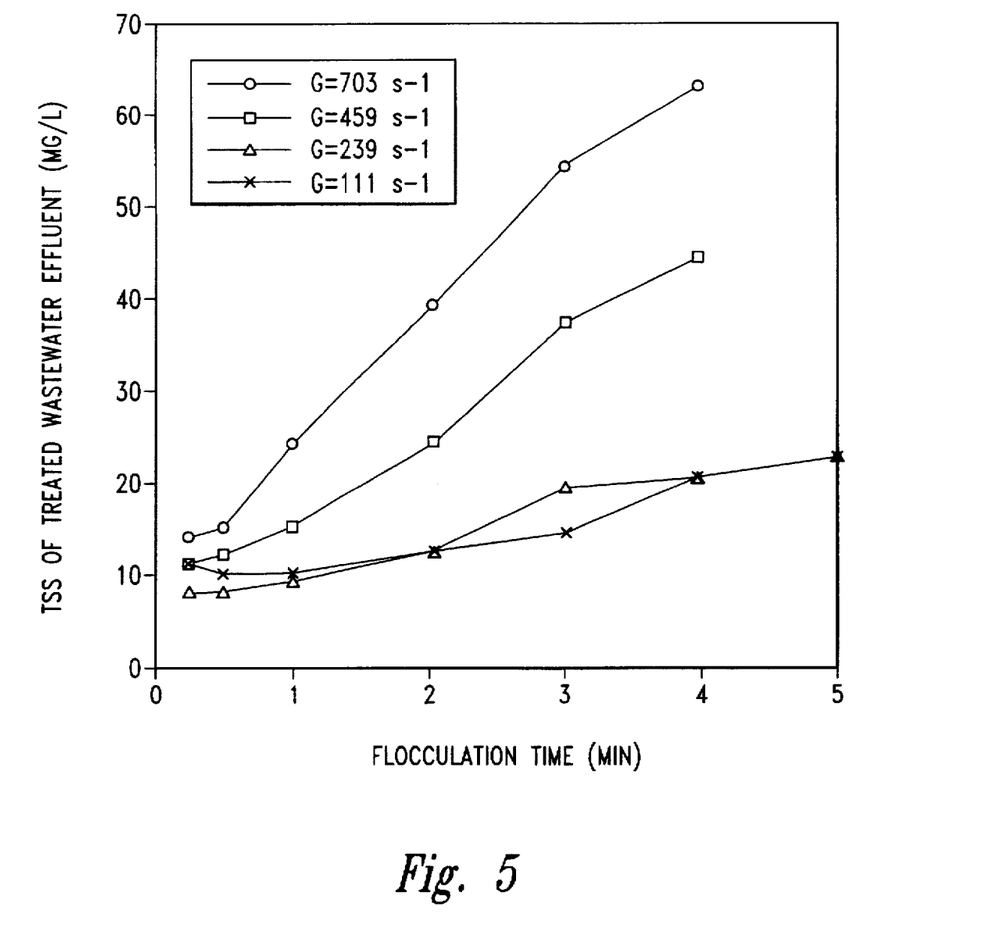
FIG. 5 is a graph showing TSS of effluent versus flocculation time for sewage treatment using 4 mg/L $Al^{3+}$.

The impeller 47 as shown in FIGS. 1 and 2 is typically located in an enlarged diameter section of the internal recirculation reactor upflow tube. The enlarged diameter section provides a larger volume and greater residence time zone to promote the formation of mixed flocculents. The upper portion of the upflow tube 14 is generally 2 to 3 times the diameter of the lower tube. The higher velocity in the lower tube suspends the particles to the point where the impeller continues to provide the energy to suspend the larger flocs. Impeller 47 is preferably either a marine or hydrofoil type impeller which provides gentle mixing for additional flocculation time without destroying the flocs already formed. Impeller 47 maintains suspension of the flocs and inert particles prior to their movement out of the internal recirculation chamber. In practice, impeller 47 is rotated at a speed to provide just enough agitation to produce sufficient mixing in the internal recirculation reactor upflow tube of the suspended solids in the influent, inert particles and flocculant to promote the formation of flocs without inducing shear that would break the formed flocs apart. The impeller 47 also provides the internal recirculation flow. For the embodiments of FIGS. 3 and 4, the upflow tube can be a single diameter with an upward flow axial turbine to provide the necessary hydraulic flow.

Further in operation of the system, the impeller 47 is designed and operated to impart just enough turbulence to maintain the solids in suspension in the upper section of upflow tube 14 with as little shear as possible as flocs are forming. The mixing in upflow tube 14 advantageously utilizes the differential sedimentation phenomenon for floc production with the addition of the inert particles. Thus, the flocs and treated water that overflow the top edge 3 of the internal recirculation reactor upflow tube 14 into the downflow zone 34 are generally uniformly mixed. At this juncture, it should be appreciated that the internal recirculation reactor 14 is designed and sized to provide sufficiently short residence times and that the hydraulic velocities aid in keeping the inert particles suspended. The impeller 47 provides uniform mixing of the flocculant, influent and inert particles over the range of normal load operations. The residence time in the internal recirculation reactor varies depending on the particular application from about 0.5 to 2 minutes for typical wastewater treatment to about 2 to 6 minutes for typical potable water treatment.

As the flocs and treated influent overflow the top edge 3 of the internal recirculation chamber, the fluid velocity accelerates from less than 100 meters/hour at arrow 49 to over 90 meters/hour at arrow 50. The velocities through the downflow zone 34 generally are dependent upon the relative diameters of the internal recirculation reactor 14 and the downflow vessel 23, at least to a first-order approximation. In practice, the relative diameters of the internal recirculation reactor 14 and the downflow vessel 23, are sized such that the down flow velocities are relatively high without creating shear in the liquid that would break up the flocs. After the flocs and treated influent pass below the enlarged diameter portion 27 of the internal recirculation reactor 14, the fluid flow velocity decreases at arrow 51 to less than 50 meters/hour. Outside of the downflow vessel 23, the clarified effluent rises in clarification zone 5 and through the optional settling plates 4 (e.g., at velocities of about 10 to about 150 meters/hour) and, finally, overflows into the collection system 17.

As previously discussed, the recirculation ratio is the ratio by volume of mixed flocculents which are recirculated to the volume of mixed flocculents which settle out to be removed from the reactor. This ratio is highly dependent on the application including the influent, the pretreatment involved, the flocculent type and dosage and several other factors. The ballasted flocculation process generally removes 80% to 90% of the material it is designed to remove on the first pass. As with all processes in which several variables are important, influent samples must be analyzed and the process designed based on the laboratory results for the specific set of process variables involved. In order to provide the velocities and short residence times desired, for this specific internal recirculation reactor using ballasted flocculation and differential sedimentation, the recirculation ratio will generally be about 5 to 10 Q or 5 to 10 times the influent flowrate.

With regard to the embodiment shown in FIGS. 1–4, drive unit 25 of conventional construction is mounted atop the bridge 24 to drive the impeller 47 and optional raking mechanism 37. (The rotation rates of the two devices can, of course, be different; typically, the impeller 47 rotates at a much faster rate than the raking mechanism). In the illustrated embodiment, the raking mechanism 37 is of the conventional construction and is mounted to rake settled solids across the bottom or floor 13 of the tank to the collection cone 15 such that no sludge build up occurs on the bottom wall. For larger settling tanks, a sloping bottom wall 13 of any angle from 0 to about 15 degrees is used in combination with the raking mechanism. Sludge scraper 65 attached to shaft 7 below bearing 62 rotates within collection cone 15 to prevent the build up sludge in the cone.

From the collection cone 15 in any of FIGS. 1–4, settled solids and inert particles are pumped to inlet 12 of separation device 6 (e.g., hydrocyclone) via conduit 39 by high shear recirculation pump 8. Pump 8 withdraws the settled solids and inert particles from the collection cone 15 through conduit 66 at a sufficient rate to remove the inert particles and settled solids. In some operations, pump 8 prevents a build up of sludge in the bottom of the settling tank or in the collection cone. In operation, high shear pump 8 breaks the bonds between the sludge and inert particles to assist the separation device 6 in separating the inert particles, which are re-cycled into the internal recirculation reactor 14 through separating device underflow 16, and the sludge which is discharged through outlet 18 of separating device 6. A flush-out connection 10 can be provided in conduit 66.

Concomitant with the removal of thickened, settled solids via the collection cone 15, clarified effluent is removed at the liquid surface 29 in the settling tank 2 via the collection system 17. Various suitable collection systems which can be used in the present invention are well known in the sedimentation art.

At this juncture, it can be appreciated that the above-described sedimentation device is a unique combination of a chemical reactor and clarifier within a single vessel. It is a compact unit that can be used in a liquid-solid separation process with improved separation efficiency (i.e. high capacity) due to short residence times in the internal recirculation reactor 14. The improved separation efficiency is due as much to the high settling rates in the clarification zone as it is to the short residence times in the internal recirculation reactor. These two principles work together. The inert particles increase the flocculation rate resulting in a short residence time and a small clarifier. The high settling rate resulting from the use of the inert particles and polymer greatly reduces the necessary size of the clarification zone. One important feature of the process is the introduction of inert particles in the chemical treatment process which are recovered and recycled within the system. The inert particles, with high specific gravity, function as nuclei for binding with fine suspended solids by a long chain polyelectrolyte to produce large and dense flocs. The flocs formed in such a way settle rapidly and are easily separated from the liquid phase. The inert particles also work as flocculation aid and provide a large surface are that substantially increases the probability of particle collision, speeding the agglomeration of the flocs and enhancing separation efficiency. As a direct consequence, the overall size of the clarifier is significantly reduced and the capital equipment costs are reduced. In the following, various process steps will be described employing the above described sedimentation device.

PROCESS STEP 1

Pre-treatment of influent (e.g., to screen, adjust pH, add coagulant and to provide other chemical/physical conditioning) as required. In each wastewater or water treatment application the influent is analyzed and pretreatment is provided based on what is required to bring the influent into a normal processing range.

PROCESS STEP 2

The internal recirculation reactor 14 is used to bring the influent to be treated, the chemical flocculant and the inert particles together in a controlled manner which results in flocculation of suspended solids which are then removed from the influent in the settling tank 2. The short residence time in the internal recirculation reactor, in the range of 10 to 300 seconds, results in much smaller equipment requirements to accomplish an equivalent level of wastewater or water purification. The reactions, both chemical and physical, which occur in the internal recirculation reactor 14 are controlled to provide adequate mixing and contact of the suspended solids with the flocculant to provide flocs. The mixing is not so turbulent or long lasting so as to break up the delicate flocs produced. Adequate but not excessive mixing and adequate but not excessive residence time are based on the influent characteristics and coagulation mechanisms. Mixed flocculents which have not reached an adequate size and/or weight in the downflow zone 34 to withstand the hydraulic flow into the upflow tube 14 will be recycled until such time that they grow to a sufficient size and/or weight to withstand the hydraulic flow into the upflow tube 14 and settle to the bottom of the clarifying zone and then into the collection cone for removal of the sludge and recirculation of the inert particles.

Examples of the process variables are listed in the following Table I. All of the values are approximate and therefore may be greater or less for any particular operating process. The range for each of these variables allows for adjustment in the process depending on variations in influent flow rate which affects residence time and therefore the other mixing characteristics which are adjusted accordingly, for example, lower influent flow rates require lower amounts of inert particles but result in longer residence times. Therefore, impeller rotation speed would be reduced to lower the internal recirculation ratio values. Likewise, the ranges given allow for adjustments due to larger mixing systems and designs which are affected by other factors (such as impurities, temperature, etc.) in addition to the mixing requirements, for example, ranges in impeller sizes and distances from the liquid surface and the bottom of the internal recirculation reactor allow for optimization of internal recirculation ratio values.

TABLE I

|  | Nominal | Range |
| --- | --- | --- |
| Residence time in internal recirculation reactor (sec) | 30 | 10–300 |
| Inert particle concentration (mg/L of influent) | 10 | 1–100 |
| Flocculant concentration (mg/L of influent) | 2 | 0.1–10 |
| Internal recirculation ratio (IR/Q) | 5 | 0–10 |

PROCESS STEP 3

The downflow zone 34 in the sedimentation device provides a transportation path into the settling tank free of mechanically induced turbulence and no or a minimum of shear for the flocculated mixture. The operational parameters on this step are such that (a) no turbulence is induced and any shear which occurs does not destroy the flocs and (b) that the path to the settling tank is short and efficient. In the systems having a circular cross-section shown in FIGS. 1–4, this zone is around the outer surface 30 of the internal recirculation reactor 14 and is surrounded by the inner surface 32 of down-flow vessel 23. Downflow vessel 23 prevents short circuiting of the flocs and treated influent into the clarification zone 5. In a rectangular system (not shown) this zone is rectangular or circular leading from the internal recirculation reactor 14 to the clarification zone 5. There is no particulate suspension or mixing required or induced in the downflow zone. The treated influent and flocs pass through the downflow zone without further mechanical agitation. Differential sedimentation takes place to a large degree in the downflow zone wherein the size of the flocs and the removal of impurities increases significantly.

The configuration of the downflow zone 34 insures that the treated influent and flocs pass downward to the bottom of settling tank 2 without substantial deleterious turbulence or shear. There is no turbulent flow in the region where the mixed influent is passed from the downflow zone to the clarification zone 5. Typically, low flow rates of less than 60 meters/hour are maintained in this transition region so that the particulate loaded flocs are not destroyed.

PROCESS STEP 4

The clarification zone 5 can operate with or without separator or lamella palates 4. In the system without lamella plates, a rise rate of 20 meters/hour and higher can be used compared to rise rates of 1 to 2 meters/hour in conventional system clarifiers. The higher rise rates for this system compared to the conventional system result primarily from the use of the inert particles and polymer added to the influent. The use of lamella plates can be used to increase the capacity of the system. The upper part of the clarification zone 5 contains a collection system 17 for directing the clarified effluent to the system outlet 19. The sludge sedimented from the influent is collected at the bottom of the collection cone 15 and pumped to a separation device 6.

PROCESS STEP 5

The sludge/inert particle separation operation separates the inert particles from the sludge using a high shear recirculation pump 8 to transport the sludge mixture to the separation device 6. The inert particles are then recycled into the internal recirculation reactor 14 to be reused. The sludge is transported out of the system to be disposed of using known devices such as a belt press.

TESTS

Tests of the above-described apparatus and process were carried out in the laboratory and the field.

Figure 6:
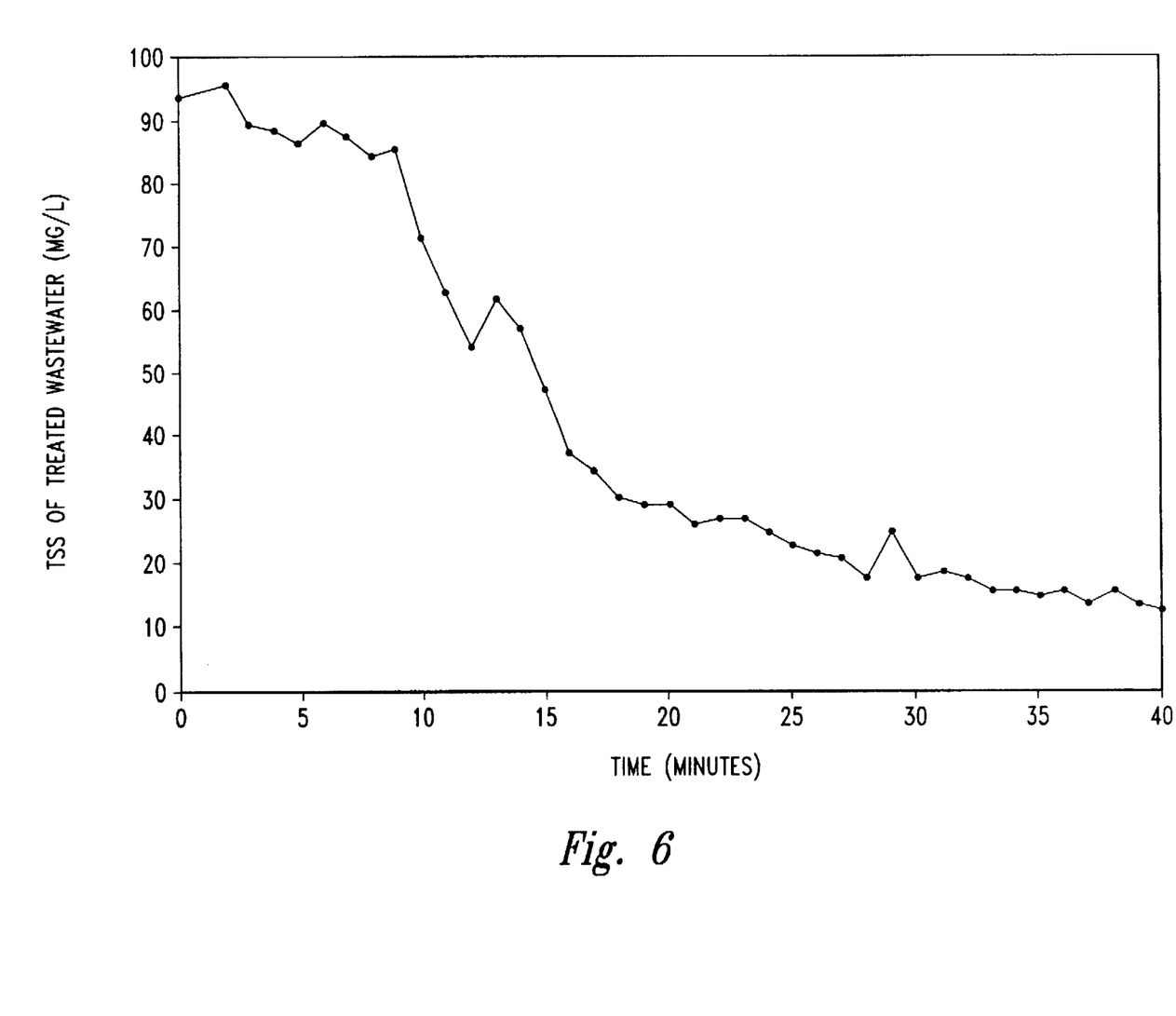
FIG. 6 is a graph showing TSS of treated waste water versus flocculation time for a internal recirculation reactor residence time of 34 seconds.
Figure 7:
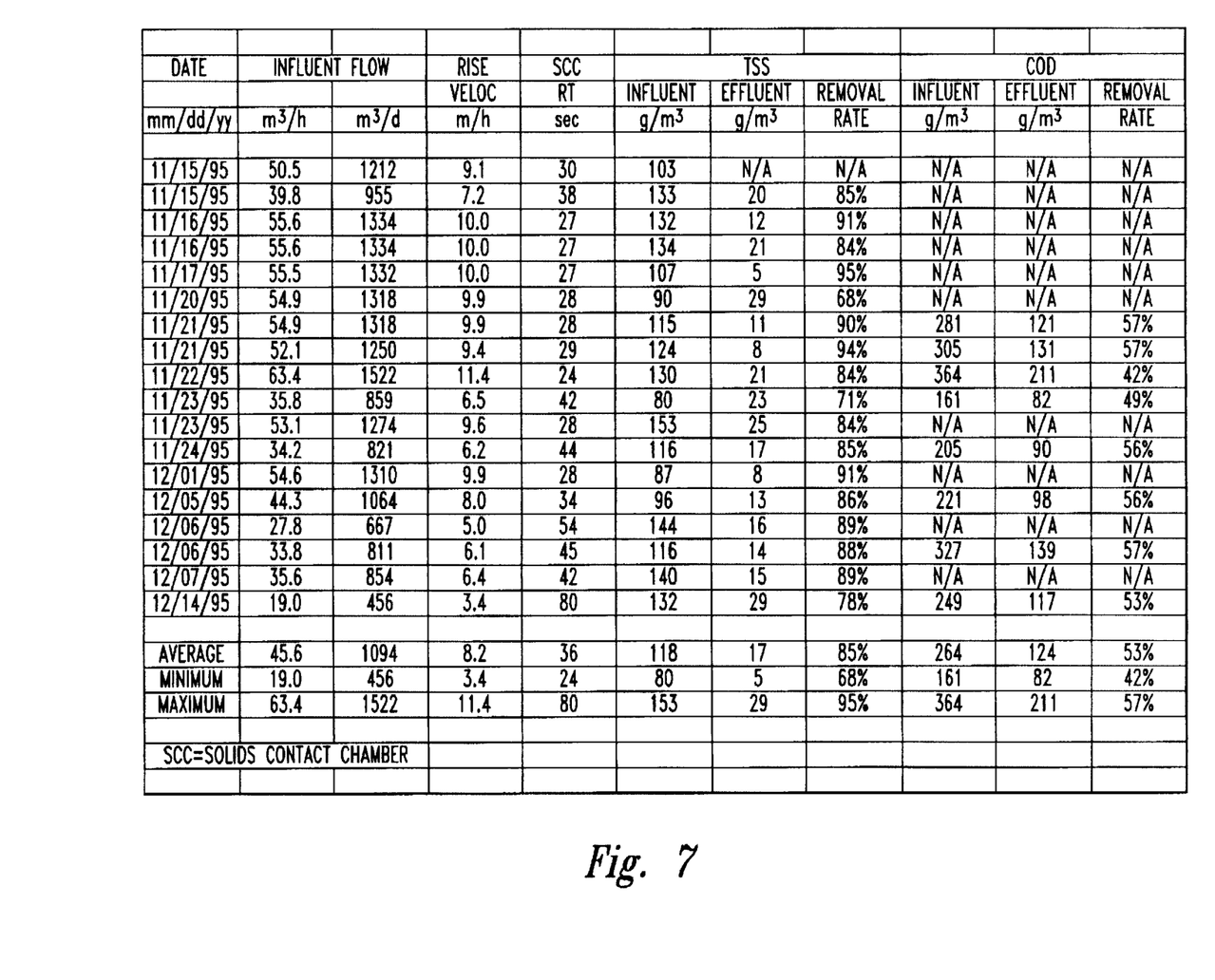
FIG. 7 is a table showing test results from the continuous operation of a three meter diameter unit.
Figure 8:
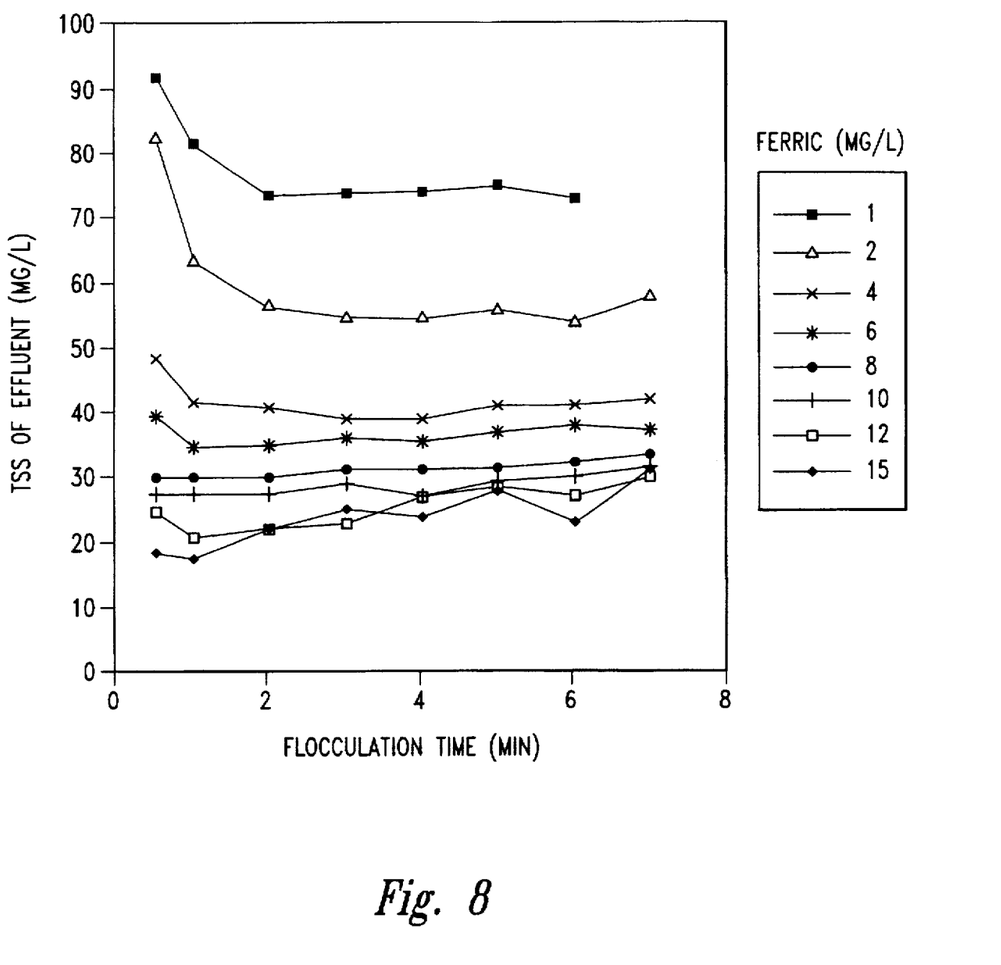
FIG. 8 is a graph showing TSS of effluent versus flocculation time for variation of TSS reading with mixing time at different ferric chloride dosage rates.

FIGS. 5–8 illustrate the results of tests conducted on sewage wastewater using various flocculant and types of agitation. In addition, FIG. 6 illustrates long-term full-scale performance results of a 3 meter diameter sedimentation device. In FIGS. 5–8, TSS is the abbreviation for total suspended solids, COD is the abbreviation for chemical oxygen demand, SCC represents the internal recirculation reactor and RT is the abbreviation for residence time.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

What is claimed is:

1. A process for separating suspended solid materials from an influent by ballasted flocculation and differential sedimentation, comprising:

combining a flow of pretreated influent, flocculant and inert particles with agitation in an upflow zone of an internal recirculation reactor to produce a flocculated mixture including the suspended solid materials;

passing the flocculated mixture from the upflow zone of the internal recirculation reactor into a downflow zone of the internal recirculation reactor utilizing differential sedimentation without mechanical agitation, wherein the pretreated influent, flocculant and inert particles are subjected to just sufficient agitation in the upflow zone of the internal recirculation reactor to produce sufficient mixing of the influent, flocculant and inert particles to form the flocs by ballasted flocculation without inducing shear that prevents the formation of the flocs or breaks apart the flocs;

recirculating a first portion of the flocculated mixture from the downflow zone of the internal recirculation reactor into the upflow zone of the internal recirculation reactor;

passing a second portion of the flocculated mixture from the downflow zone of the internal recirculation reactor into a settling zone; and removing clarified liquid from an upper region of the settling zone and settled flocs from a lower region of the settling zone.

2. The process of claim 1 further compromising:

separating the settled flocs into sludge and the inert particles; and recycling the inert particles into the internal recirculation reactor.

3. The process of claim 1 wherein the pretreated influent, flocculant and inert particles are resident in the internal recirculation reactor for a period of time in the range of or about 10 to about 300 seconds.

4. The process of claim 1 wherein the recirculation rate is varied by varying the speed of an impeller located in the internal recirculation reactor.

5. A process for separating suspended materials from an influent by ballasted flocculation and differential sedimentation, comprising:

propelling a flow of pretreated influent, flocculant and inert particles in an internal recirculation reactor to produce a flow of flocculated mixture including the suspended materials in a first direction through an upflow zone of the internal recirculation reactor;

passing the flocculated mixture along the first direction through the upflow zone of the internal recirculation reactor and then along a second direction through a downflow zone of the internal recirculation reactor by differential sedimentation without mechanical agitation, wherein the pretreated influent, flocculant and inert particles are subjected to sufficient propulsion in the upflow zone of the internal recirculation reactor to produce sufficient mixing of the influent, flocculant and inert particles to form the flocs by ballasted flocculation without inducing shear that prevents the formation of the flocs or breaks apart the flocs;

recirculating a first portion of the flocculated mixture from the downflow zone of the internal recirculation reactor into the upflow zone of the internal recirculation reactor along the first direction;

passing a second portion of the flocculated mixture from the downflow zone of the internal recirculation reactor into a settling zone; and removing clarified liquid from an upper region of the settling zone and settled flocs from a lower region of the settling zone.

6. The process of claim 5 further comprising:

separating the settled flocs into sludge and the inert particles; and recycling the inert particles into the internal recirculation reactor.

7. The process of claim 5 wherein the pretreated influent, flocculant and inert particles are resident in the internal recirculation reactor for a period of time in the range of about 10 to about 300 seconds.

8. The process of claim 5 wherein the recirculation rate is varied by varying the speed of an impeller located in the internal recirculation reactor.

9. A process for separating suspended solid materials from an influent by ballasted flocculation and differential sedimentation, comprising:

combining a flow of pretreated influent, flocculant and inert particles in an internal recirculation reactor at a flocculation stage to produce a flocculated mixture flowing in a first direction;

passing the flocculated mixture in the first direction through an upflow zone of the internal recirculation reactor and then in a second direction through a downflow zone of the internal recirculation reactor utilizing differential sedimentation without mechanical agitation, wherein the pretreated influent, flocculant and inert particles are subjected to sufficient propulsion in the upflow zone of the internal recirculation reactor to produce sufficient mixing of the influent, flocculant and inert particles to form the flocs by ballasted flocculation without inducing shear that prevents the formation of the flocs or breaks apart the flocs;

recirculating a first portion of the flocculated mixture from the downflow zone of the internal recirculation reactor into the upflow zone of the internal recirculation reactor along the first direction;

passing a second portion of the flocculated mixture from a lower portion of the downflow zone of the internal recirculation reactor downwardly into a settling zone without additional mechanical agitation; and removing clarified liquid from an upper region of the settling zone and settled flocs from a lower region of the settling zone.

10. The process of claim 9 further comprising:

separating the settled flocs into sludge and the inert particles; and recycling the inert particles into the internal recirculation reactor.

11. The process of claim 9 wherein the pretreated influent, flocculant and inert particles are resident in the internal recirculation reactor for a period of time in the range of about 10 to about 300 seconds.

12. The process of claim 9 wherein the recirculation rate is varied by varying the speed an impeller located in the internal recirculation reactor.

* * * * *